(12) United States Patent
Tucker

(10) Patent No.: US 8,398,024 B2
(45) Date of Patent: Mar. 19, 2013

(54) WING COVER PANEL ASSEMBLY AND WING COVER PANEL FOR AN AIRCRAFT WING AND A METHOD OF FORMING THEREOF

(75) Inventor: Michael Tucker, Bristol (GB)

(73) Assignee: Airbus Operations Limited, Bristol (GB)

( * ) Notice: Subject to any disclaimer, the term of this patent is extended or adjusted under 35 U.S.C. 154(b) by 1021 days.

(21) Appl. No.: 12/302,862

(22) PCT Filed: Jul. 5, 2007

(86) PCT No.: PCT/GB2007/050382
§ 371 (c)(1),
(2), (4) Date: Nov. 28, 2008

(87) PCT Pub. No.: WO2008/007135
PCT Pub. Date: Jan. 17, 2008

(65) Prior Publication Data
US 2009/0200423 A1 Aug. 13, 2009

(30) Foreign Application Priority Data

Jul. 13, 2006 (GB) .................................. 0613949.7

(51) Int. Cl.
*B64C 1/00* (2006.01)
(52) U.S. Cl. .................................................. 244/123.1
(58) Field of Classification Search ............... 244/123.1, 244/123.7, 123.8, 124, 131, 132; 29/889.7, 29/897.2
See application file for complete search history.

(56) References Cited

U.S. PATENT DOCUMENTS

| 1,331,150 | A | * | 2/1920 | Hooper | 244/132 |
| 1,372,478 | A | * | 3/1921 | Bradley | 244/117 R |
| 1,796,654 | A | * | 3/1931 | Otto | 244/123.1 |
| 2,396,625 | A | * | 3/1946 | Watter | 244/123.1 |
| 2,473,728 | A | | 6/1949 | Rutledge | |
| 2,955,415 | A | | 10/1960 | Long | |
| 3,093,219 | A | * | 6/1963 | Ramme | 138/117 |
| 3,185,267 | A | * | 5/1965 | Pavlecka | 52/281 |
| 3,827,661 | A | | 8/1974 | Ryan et al. | |
| 3,920,206 | A | * | 11/1975 | Bigham et al. | 244/132 |
| 5,887,828 | A | | 3/1999 | Appa | |
| 2005/0247756 | A1 | | 11/2005 | Frazer et al. | |

FOREIGN PATENT DOCUMENTS

| BE | 428581 | 7/1938 |
| GB | 1128331 | 9/1968 |
| GB | 2312483 A | 10/1997 |

(Continued)

OTHER PUBLICATIONS

ISR for PCT/GB2007/050382 dated Apr. 1, 2008.
British Search Report for GB0613949.7 dated Nov. 9, 2006.
Translation of Japanese Office Action for Application No. 2009-518973 mailed Jul. 3, 2012.

*Primary Examiner* — Tien Dinh
*Assistant Examiner* — Keith L Dixon
(74) *Attorney, Agent, or Firm* — Lowe Hauptman Ham & Berner LLP

(57) ABSTRACT

A wing cover panel assembly, wing cover and method of forming thereof are disclosed in which an attachment surface of the wing cover panel is provided with a locating channel into which a wing structural element such as a stringer or spar is captured so as to fix the wing structural element to the wing cover panel.

19 Claims, 3 Drawing Sheets

FOREIGN PATENT DOCUMENTS

| | | |
|---|---|---|
| JP | 50-014319 | 5/1975 |
| JP | 2001-025192 | 1/2001 |
| SU | 1826409 | 12/1995 |
| WO | 2005/098241 A1 | 10/2005 |

\* cited by examiner

# US 8,398,024 B2

WING COVER PANEL ASSEMBLY AND WING COVER PANEL FOR AN AIRCRAFT WING AND A METHOD OF FORMING THEREOF

RELATED APPLICATIONS

The present application is based on International Application Number PCT/GB2007/050382, and claims priority from British Application Number 0613949.7 filed Jul. 13, 2006, the disclosures of which are hereby incorporated by reference herein in their entirety.

FIELD OF INVENTION

The present invention relates to a wing cover panel or wing cover panel assembly for an aircraft wing and a method of forming thereof.

BACKGROUND OF THE INVENTION

One construction method for aircraft wings involves creating a wing box, which forms the core of the wing. The wing box is fared into the aircraft fuselage and runs from the root towards the tip of the wing. The wing box provides the central sections of the upper and lower aerofoil surfaces for the wing, in addition to attachment points for engine pylons and control surfaces such as ailerons, trim flaps and airbrakes. The aerofoil surfaces of the wing box are provided by panels referred to as wing cover panels. The wing box includes a number of structural elements called spars and stringers, which run within the wing box structure from the root towards the tip. The spars provide the main structural component of the wing box forming the forward and aft fuel boundaries. The stringers are arranged to provide structural stability and integrity to the wing cover panels. These structural elements thus enable the wing box to provide the necessary strength for the wing during operational loading.

Wing boxes are commonly constructed from a set of discrete spars and wing cover panels, which form the walls of the wing box. Individual stringers are fastened to the wing cover panels and the wing cover panels fastened to flanges on the spars at the corners of the wing box. A consequence of this is that a large number of fixing holes are drilled in the wing cover panels and the flanges of both spars and stringers to allow bolts or rivets to be inserted. These holes are potential crack initiation sites. When building aircraft structures, one of many considerations is the balance between weight and strength. In other words, structures need to be as light as possible while providing the necessary strength and structural integrity to perform properly under operational loads. However, these weight and strength considerations have to be significantly compromised to protect the structure from any crack growth resulting from fixing holes.

SUMMARY OF THE INVENTION

An embodiment of the invention provides a wing cover panel assembly for an aircraft wing comprising:
a wing cover panel having an aerofoil surface on one side for providing an aerofoil surface for a wing and an attachment surface on the other side for providing one or more attachment points for one or more wing structural elements;
a pair of opposing lugs formed in the attachment surface so as to provide a locating channel in the attachment surface; and
a wing structural element having a first flange and a second flange each arranged to be captured within the locating channel by respective opposing lugs so as to fix the wing structural element to the wing cover panel to form the wing cover panel assembly.

The or each flange may be fitted to the or each lug. The wing structural element may be freeze fitted within the channel. The attachment surface may further comprises a seat disposed generally opposite the lug within the channel, the seat being arranged as a bearing surface for a first portion of the flange captured within the channel and to hold a remaining second portion of the flange away from the attachment surface. The locating channel may be formed by a single lug for locating the first flange, the other flange being fastened directly to the attachment surface.

A bonding layer may be provided between the wing structural element and the attachment surface. The or each lug may form the locating channel by providing opposing grooves, the grooves having a tapered depth so as to provide clamping effect on the or each flange. The wing structural element may be a stringer. The wing structural element may be a spar. The wing cover panel may be integrally formed with the locating channel. The wing cover panel may be formed from one or more sub-panels.

Another embodiment provides a wing cover panel for an aircraft wing comprising:
a wing cover panel having an aerofoil surface on one side for providing an aerofoil surface for a wing and an attachment surface on the other side for providing one or more attachment points for one or more wing structural elements; and
a pair of opposing lugs formed in the attachment surface so as to provide a locating channel in the attachment surface, the locating channel being arranged to capture a first flange and a second flange of a wing structural element so as to fit the wing structural element to the wing cover panel.

A further embodiment provides a method of forming a wing cover panel assembly for an aircraft wing, the method comprising the steps of:
a) forming a wing cover panel having an aerofoil surface on one side for providing an aerofoil surface for a wing and an attachment surface on the other side for providing one or more attachment points for one or more wing structural elements;
b) forming a pair of opposing lugs in the attachment surface so as to provide a locating channel in the attachment surface;
c) locating a first flange and a second flange of a wing structural element within the locating channel by capturing the flanges within respective opposing lugs so as to fit the wing structural element to the wing cover panel to form the wing cover panel assembly.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
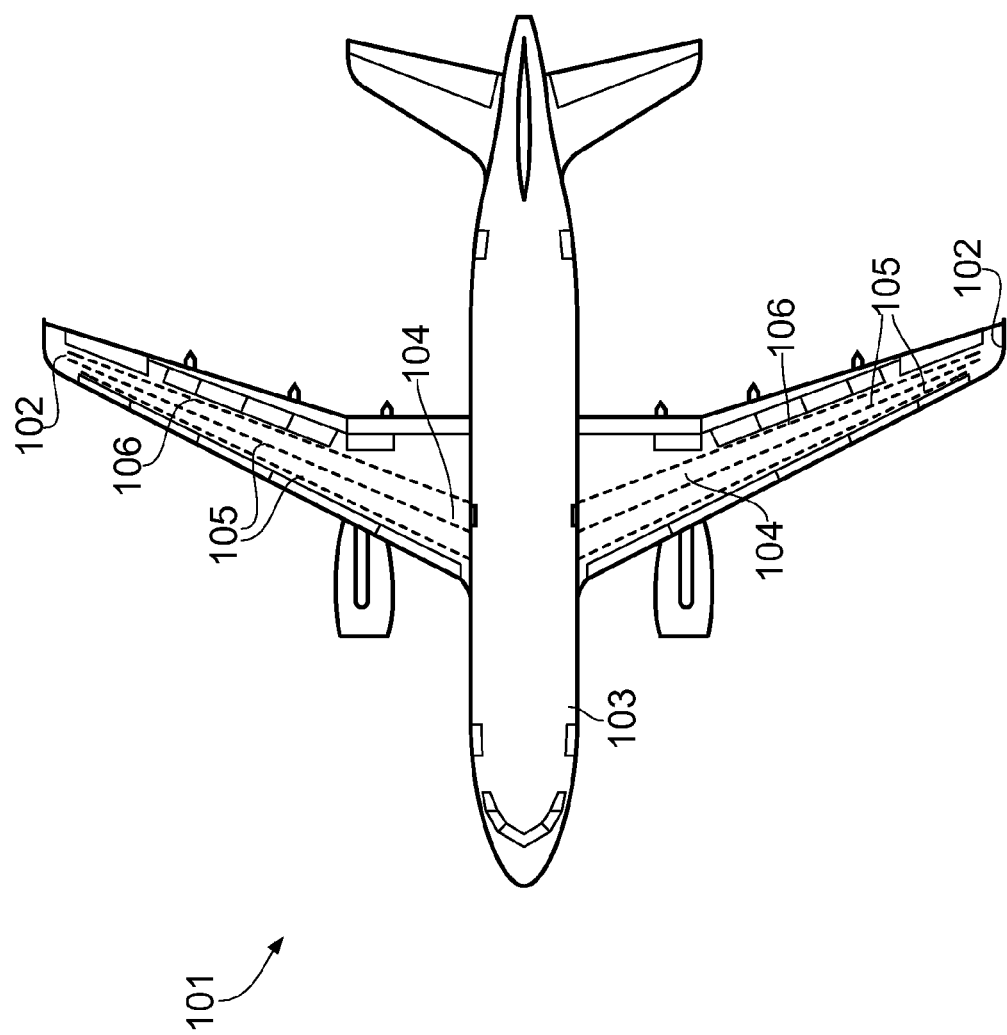
FIG. 1 is a plan view of an aircraft.

With reference to FIG. 1, an aircraft 101 comprises wings 102 attached to a fuselage 103. The wings 102 comprise a central structural element 104 in the form of a wing box. The wing box 104 runs from the root to the tip of each wing 102 and between the leading and trailing edges of the wing. The wing box 104 comprises a number of structural elements in the form of stringers 105 and spars 106, which run from the root to the tip of each wing box 104.

Figure 2:
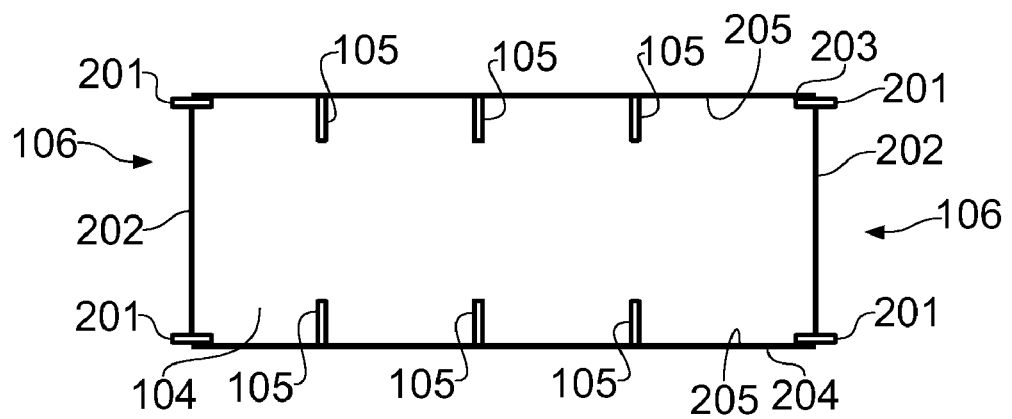
FIG. 2 is a cross-sectional view of a wing box of the aircraft of FIG. 1.

With reference to FIG. 2, the wing box 104 comprises two spars 106 which each comprise two spar caps 201 interconnected by a web 202. The spars caps 201 and webs 202 provide attachment points for the leading and trailing edge structures (not shown) of the wing 102. The upper and lower surfaces of the wing box 104 are each formed from respective wing cover panels 203, 204, which provide the upper and lower aerofoil surfaces of the wing 102. The surfaces of the wing covers 203, 204 that are interior to the wing box 104 provide attachment surfaces 205 for the wing structural elements 105, 106. The spar caps 202 are attached to the attachment surfaces 205 at each corner of the wing box 104 and the stringers 105 are fixed at spaced intervals across the attachment surface 205 of the wing cover panels 203, 204 between the spars 106.

Figure 3:
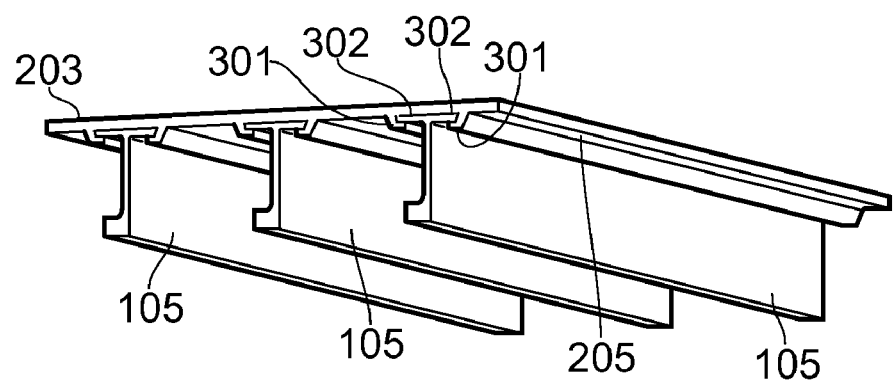
FIG. 3 shows a side perspective view of a wing cover in the wing box of FIG. 2.

FIG. 3 shows the attachment of the stringers 105 to the wing cover panel 203 in further detail. In the present embodiment, the wing covers have pairs opposing of lugs 301 formed in the attachment surface 205, which run span-wise. In the present embodiment, the lugs 301 are machined in the attachment surface 205. Each pair of lugs 301 is arranged to provide a locating channel 302 in the attachment surface 205. Each stringer 105 has a cross section in the shape of the letter J, thus providing a first and second flanges 303. The first and second flanges 303 are captured within the locating channel 302 and held within the channel 302 by respective lugs 301. In this manner, the stringers 105 are fixed to the attachment surface 205 of the wing cover panel 203 to provide a wing cover panel assembly.

In the present embodiment, the stringers 105 are freeze fitted into the channel 302. In this assembly method, wing cover panel 203 and each stringer 105 are prepared for assembly. The dimensions of the flanges 303, the channel 302 and the groove provided by the lugs 301 are machined within tolerances that enable freeze fitting. In other words, the tolerances are such that when the stringers are frozen, they can be moved into place in the channels 302 and that at working temperature, they expand and are fixedly captured within the channel 302. Shrinkage for aluminium at −80° C. is approximately 0.1 mm per 25 mm of diameter or thickness, therefore assuming that the flanges 303 are 8 mm in thickness an additional 0.03 mm clearance is obtained by freezing over and above the clearance fit selected for assembly. The stringers are cooled, using dry ice (frozen carbon dioxide) or liquid nitrogen, for three hours prior to assembly. Once cooled, to a temperature of around −80° C., the stringers 105 are inserted into the channels 302 and allowed to gradually return to ambient temperature. As the stringers 105 expand, the tolerances are such that the flanges 303 become firmly engaged within the grooves provided by the lugs 301 to capture the stringers 105 within the channel 302 so as to fit the stringers 105 to the wing cover panel 203.

Figure 4:
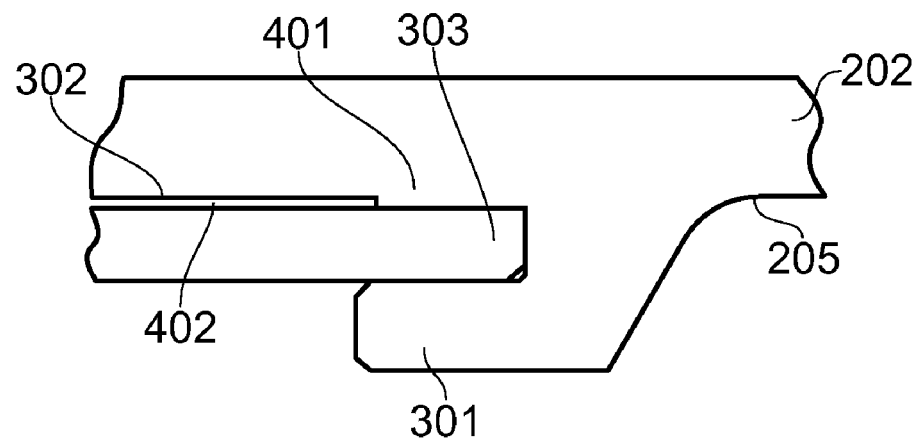
FIG. 4 shows a detailed cross section of the stringer attachment to a wing cover in another embodiment.

In another embodiment, as shown in FIG. 4, a seat 401 is provided in the groove formed by the lug 301 in the attachment surface 205 of the wing cover panel 203. The seat 401 stands proud of the remainder of the attachment surface 205 within the location channel 302. The flange 303 of the stringer is held in place on the seat 401 by the lug 301 while the remainder of the face of the stringer 105 opposite the attachment surface 205 is spaced away from the attachment surface forming a gap 402. The seat 401 in combination with the gap 402 simplify the manufacture and assembly process for the wing panel assembly since the tolerances only need be machined over the smaller area of the seat 401 and lug 301 rather than over the whole of the channel 302.

In a further embodiment, a bonding layer is placed in the gap 402 for bonding the stringer 105 within the channel 302. In another embodiment, the gap 402 is maintained as an air space to provide ventilation thereby reducing possible corrosion.

Figure 5:
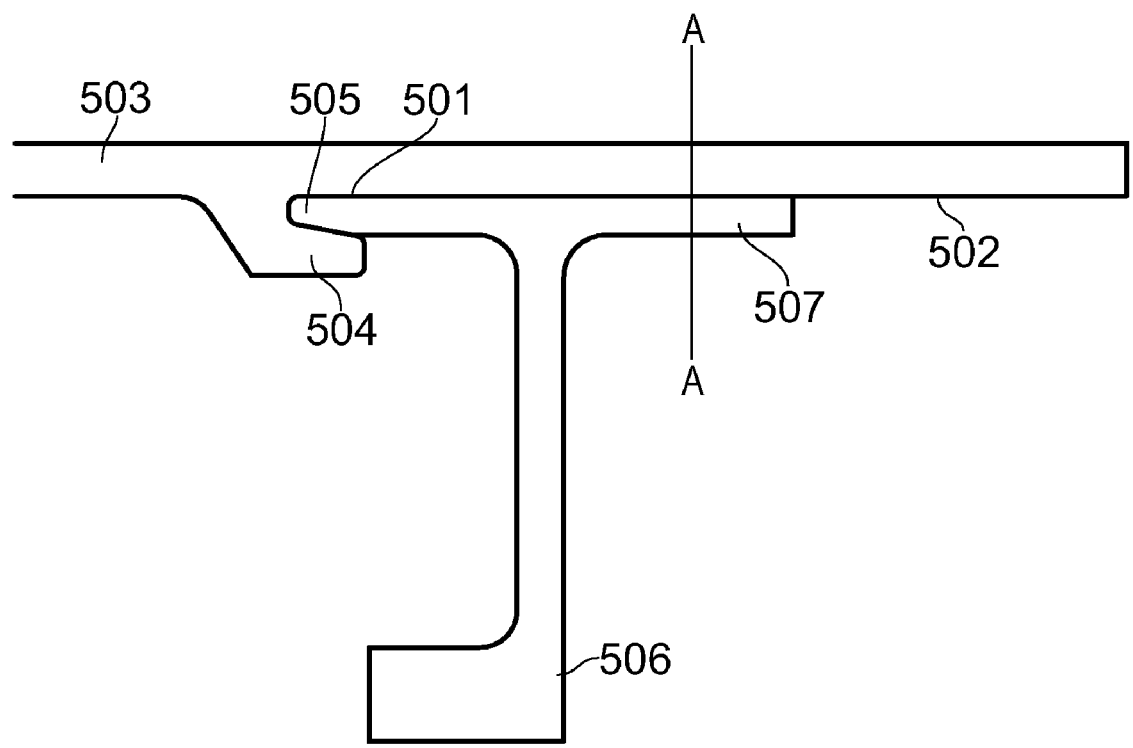
FIG. 5 shows a cross section of a stringer attached to a wing cover in a further embodiment.

In a further embodiment, as shown in FIG. 5, a locating channel 501 is formed in the attachment surface 502 of a wing cover 503 by a single lug 504. The lug 504 provides a single span wise groove into which a first flange 505 of a wing structural member 506 is located and captured. A second flange 507 is fixed directly to the attachment surface of the wing cover panel 502 through the line A-A in FIG. 5. The second flange 507 is fixed by conventional means such as continuous bonding or welding, or riveting or bolting. In addition, the interior of the groove provided by the lug 504 is tapered so as to provide a clamping effect on the first flange 505, which is correspondingly tapered.

In another embodiment, the wing structural element is additionally fixed within the locating channel by conventional means such as bonding, crimping, friction stir welding, riveting, bolting or screwing. One or more of such conventional fixing means may be employed either continuously or intermittently along the length of the channel.

In a further embodiment, stringers are attached using a two lug locating channel as shown in FIG. 3 while spar caps are attached using a single lug channel as shown in FIG. 5. In another embodiment, spar caps are attached using a two lug locating channel as shown in FIG. 3 while stringers are attached using a single lug channel as shown in FIG. 5. In a further embodiment, where a single lug channel is used to attach a wing structural element, the other flange is fitted to the wing cover panel by a plate, the plate itself being fitted to the wing cover panel by conventional means. The plate effectively provides a second lug to capture the other flange within the locating channel and thereby provides a two part, two lugged locating channel. The plate may be provided as an independent structure or may be provided as part of another structural element of the wing box. For example, the plate may be integral with a leading or trailing edge structure and therefore serve to fix both a flange of a spar cap and the leading edge structure to the wing box.

In a further embodiment, the wing covers panels are extruded with one or more locating channels integrally formed on their attachment surface. In another embodiment, wing cover panels are built from a number of sub-panels, which are extruded and then joined together by a weld. Friction stir welding may be used to create the weld.

In a further embodiment, the locating channels are tapered in a span wise direction and the wing structural elements are correspondingly shaped so as to increase the clamping effect of the channel on the captured flanges of the wing structural element. In another embodiment, the channel is parallel in a span wise direction.

As will be understood by those skilled in the art, machining of the wing structural element or wing cover panel may be carried out by any suitable process such as milling, etching, abrading, punching or grinding. Furthermore, the wing structural element or wing cover panel may be formed from any suitable material such as a metal, metal alloy or other suitable non-metallic material.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A wing cover panel assembly for an aircraft wing comprising:
    a wing cover panel having an aerofoil surface on one side for providing an aerofoil surface for a wing and a continuous attachment surface on the other side for providing one or more attachment points for one or more wing structural elements;
    a pair of opposing lugs formed in said continuous attachment surface so as to provide a locating channel in said attachment surface; and
    a wing structural element having a first flange and a second flange each arranged to be captured within said locating channel by respective said pair of opposing lugs so as to fix said wing structural element to said wing cover panel to form said wing cover panel assembly, and
    wherein said wing structural element is freeze fitted within said locating channel.

2. A wing cover panel assembly according to claim 1 in which said first flange and said second flange each is fitted to respective one of said pair of opposing lugs.

3. A wing cover panel assembly according to claim 1 in which said attachment surface further comprises a seat disposed generally opposite said lug within said channel, said seat being arranged as a bearing surface for a first portion of said flange captured within said channel and to hold a remaining second portion of said flange away from said attachment surface.

4. A wing cover panel assembly according to claim 1 in which a bonding layer is provided between said wing structural element and said attachment surface.

5. A wing cover panel assembly according to claim 1 in which the pair of opposing lugs form said locating channel by providing opposing grooves, said opposing grooves each having a tapered depth so as to provide clamping effect on the respective one of said first and second flanges.

6. A wing cover panel assembly according to claim 1 in which said wing structural element is a stringer.

7. A wing cover panel assembly according to claim 1 in which said wing structural element is a spar.

8. A wing cover panel assembly according to claim 1 in which said wing cover panel is integrally formed with said locating channel.

9. A wing cover panel assembly according to claim 1 in which said wing cover panel is formed from one or more sub-panels.

10. A wing cover panel for an aircraft wing comprising:
    a wing cover panel having an aerofoil surface on one side for providing an aerofoil surface for a wing and a continuous attachment surface on the other side for providing one or more attachment points for one or more wing structural elements; and
    a pair of opposing lugs formed in said continuous attachment surface so as to provide a locating channel in said attachment surface, said locating channel being arranged to capture a first flange and a second flange of a wing structural element so as to fit said wing structural element to said wing cover panel, and
    wherein said wing structural element is freeze fitted within said channel.

11. A method of forming a wing cover panel assembly for an aircraft wing, said method comprising the steps of:
    a) forming a wing cover panel having an aerofoil surface on one side for providing an aerofoil surface for a wing and an attachment surface on the other side for providing one or more attachment points for one or more wing structural elements;
    b) forming a pair of opposing lugs in said attachment surface so as to provide a locating channel in said attachment surface;
    c) locating a first flange and a second flange of a wing structural element within said locating channel by capturing said flanges within respective said opposing lugs; and
    d) freeze fitting said wing structural element within said channel so as to fit said wing structural element to said wing cover panel to form said wing cover panel assembly.

12. A method according to claim 11 in which said first flange and said second flange each is fastened to respective one of said opposing lugs.

13. A method according to claim 11 in which said attachment surface further comprises a seat disposed generally opposite said lug within said channel, said seat being arranged as a bearing surface for a first portion of said flange captured within said channel and to hold a remaining second portion of said flange away from said attachment surface.

14. A method according to claim 11 in which a bonding layer is provided between said wing structural element and said attachment surface.

15. A method according to claim 11 in which the pair of opposing lugs form said locating channel by providing opposing grooves, said opposing grooves having a tapered depth so as to provide clamping effect on the respective one of said first and second flanges.

16. A method according to claim 11 in which said wing structural element is a stringer.

17. A method according to claim 11 in which said wing structural element is a spar.

18. A method according to claim 11 in which said wing cover panel is integrally formed with said locating channel.

19. A method according to claim 11 in which said wing cover panel is formed from one or more sub-panels.

* * * * *